(12) United States Patent
Chou et al.

(10) Patent No.: US 10,498,978 B2
(45) Date of Patent: Dec. 3, 2019

(54) DIGITAL IMAGING DEVICE WITH ENHANCED DYNAMIC RANGE AND OPERATING METHOD AS WELL AS DATA PROCESSING CIRCUIT THEREOF

(71) Applicant: PixArt Imaging Inc., Hsin-Chu County (TW)

(72) Inventors: Chien-Jung Chou, Hsin-Chu County (TW); Han-Chi Liu, Hsin-Chu County (TW); Wen-Cheng Yen, Hsin-Chu County (TW)

(73) Assignee: Pixart Imaging Inc., Hsin-Chu County (TW)

( * ) Notice: Subject to any disclaimer, the term of this patent is extended or adjusted under 35 U.S.C. 154(b) by 0 days.

(21) Appl. No.: 16/023,097

(22) Filed: Jun. 29, 2018

(65) Prior Publication Data

US 2018/0309943 A1   Oct. 25, 2018

Related U.S. Application Data

(63) Continuation of application No. 15/070,161, filed on Mar. 15, 2016, now Pat. No. 10,044,949.

(30) Foreign Application Priority Data

Mar. 24, 2015 (TW) .............................. 104109453 A

(51) Int. Cl.
| | |
|---|---|
| *H04N 5/355* | (2011.01) |
| *H04N 5/361* | (2011.01) |
| *H04N 5/378* | (2011.01) |
| *H04N 5/369* | (2011.01) |

(52) U.S. Cl.
CPC ............. *H04N 5/355* (2013.01); *H04N 5/361* (2013.01); *H04N 5/378* (2013.01); *H04N 5/36963* (2018.08)

(58) Field of Classification Search
CPC .... H04N 5/355; H04N 5/361; H04N 5/36963; H04N 5/378
See application file for complete search history.

(56) References Cited

U.S. PATENT DOCUMENTS

| 6,829,007 B1 * | 12/2004 | Bilhan | H04N 5/361 |
| | | | 348/241 |
| 10,044,949 B2 * | 8/2018 | Chou | H04N 5/355 |
| 2002/0012053 A1 * | 1/2002 | Yoshida | H04N 5/2176 |
| | | | 348/243 |
| 2010/0231762 A1 * | 9/2010 | Shirai | H04N 5/3658 |
| | | | 348/243 |

(Continued)

*Primary Examiner* — Daniel M Pasiewicz
(74) *Attorney, Agent, or Firm* — WPAT, PC

(57) ABSTRACT

A digital imaging device including a sensor array, an analog front end and a digital back end. The sensor array is configured to output black pixel data and normal pixel data. The analog front end is configured to amplify the black pixel data and the normal pixel data with a gain, and calibrate the amplified black pixel data and the amplified normal pixel data with a calibration value. The digital back end is configured to digitize the amplified and calibrated black pixel data, calculate a data offset according to digital black pixel data, determine a dynamic adjust scale, calculate the calibration value according to the gain, the data offset and the dynamic adjust scale, and adjust the gain according to the dynamic adjust scale.

20 Claims, 4 Drawing Sheets

(56) References Cited

U.S. PATENT DOCUMENTS

2013/0188075 A1\* 7/2013 Miyashita .............. H04N 5/335
348/229.1
2013/0271628 A1\* 10/2013 Ku ........................ H04N 5/361
348/243
2015/0116533 A1\* 4/2015 Hsu ....................... H04N 5/361
348/223.1

\* cited by examiner

DIGITAL IMAGING DEVICE WITH ENHANCED DYNAMIC RANGE AND OPERATING METHOD AS WELL AS DATA PROCESSING CIRCUIT THEREOF

CROSS REFERENCE TO RELATED APPLICATION

This application is a continuation application of U.S. application Ser. No. 15/070,161, filed on Mar. 15, 2016, and claims the priority benefit of Taiwan Patent Application Serial Number 104109453, filed on Mar. 24, 2015, the full disclosure of which is incorporated herein by reference.

BACKGROUND

1. Field of the Disclosure

This disclosure generally relates to an imaging device, more particularly, to a digital imaging device with an enhanced dynamic range and an operating method thereof.

2. Description of the Related Art

An image sensor usually includes a sensor array which senses light energy and outputs an analog signal, e.g., a current signal, a voltage signal or charges. The analog signal is then processed by an analog preprocessing and a digital post-processing to be configured as frame data.

When a photoelectric element, e.g., photodiode, outputs a photocurrent not under an absolute zero temperature, the photocurrent usually accompanies with dark current, which affects a real signal of the light energy sensed by the photoelectric element. Therefore, conventionally a so-called black level calibration (BLC) is used to eliminate the dark current signal. The black level calibration is generally implemented by disposing the black pixel in the sensor array to generate dark current to be used as a calibration value. As the name implies, the dark pixel is shielded from receiving external light, and generally the black pixel is formed by covering a shielding layer over a normal pixel.

Referring to FIG. 1, it is a schematic diagram of a conventional image sensor 9, which includes a sensor array 91, a correlated double sampling circuit (CDS) 93, an amplifier 95, an analog to digital converter (ADC) 97, a black level average circuit 98 and a subtractor 99.

The sensor array 91 includes a plurality of black pixels 91b and a plurality of normal pixels 91n. The correlated double sampling circuit 93 temporarily stores analog pixel data sequentially outputted by pixels in each row of the sensor array 91. The amplifier 95 amplifies the analog pixel data and transmits the amplified data to the analog to digital converter 97 (for example, 11 bits ADC) for digitization, as shown in FIG. 2, wherein digital pixel data of the normal pixels 91n is within a digital range of 1024-2047, and the digital pixel data of the black pixels 91b is near the digital value of 1023. The black level average circuit 98 calculates an average value of the digital pixel data of the black pixels 91b as a black level calibration value (BLC). The subtractor 99 subtracts the black level calibration value BLC from the digital pixel data of the normal pixels 91n to allow the digital pixel data of the normal pixel 91n to be within a valid dynamic range of 0-1023.

However, as shown in FIG. 3, the analog pixel data outputted by the normal pixels 91n can be affected by the pixel itself, the correlated double sampling circuit 93 and the amplifier 95 to have an offset. The offset leads the analog pixel data inputted into the analog to digital converter 97 to be out of the dynamic range (as circled by dash lines) of the analog to digital converter 97, and lowers the valid dynamic range after the black level calibration.

SUMMARY

Accordingly, the present disclosure provides a digital imaging device with an optimized dynamic range and an operating method thereof.

The present disclosure provides a digital imaging device and an operating method thereof that adjust analog pixel data in an analog stage to correspond to a dynamic range of an analog to digital converter so as to effectively utilize the dynamic range of the analog to digital converter thereby increasing the signal resolution and improving the signal quality.

The present disclosure provides an operating method of a digital imaging device. The digital imaging device includes a sensor array, an analog-to-digital converter and a digital back end. The sensor array includes a plurality of black pixels for outputting black pixel data and a plurality of normal pixels for outputting normal pixel data. The sensor array sequentially outputs a first frame and a second frame. The operating method includes the steps of: determining, by the digital back end, a gain and an initial calibration value for processing the black pixel data and the normal pixel data of the first frame to cause the analog-to-digital converter to output digital black pixel data and digital normal pixel data; calculating, by the digital back end, a data offset according to the digital black pixel data; determining, by the digital back end, a dynamic adjustment scale for amplifying the digital normal pixel data; calculating, by the digital back end, a calibration value according to the gain, the data offset and the dynamic adjustment scale; adjusting the gain, by the digital back end, according to the dynamic adjustment scale; and processing, by the digital back end, the black pixel data and the normal pixel data of the second frame according to the calculated calibration value and the adjusted gain.

The present disclosure further provides a digital imaging device including a sensor array, an analog front end and a digital back end. The sensor array includes a plurality of black pixels and a plurality of normal pixels, wherein the black pixels are configured to output black pixel data, the normal pixels are configured to output normal pixel data and the sensor array is configured to sequentially output a first frame and a second frame. The analog front end is configured to output digital black pixel data and digital normal pixel data converted from the black pixel data and the normal pixel data of the first frame processed by a gain and an initial calibration value. The digital back end is configured to determine the gain and the initial calibration value, calculate a data offset according to the digital black pixel data, determine a dynamic adjustment scale for amplifying the digital normal pixel data, calculate a calibration value according to the gain, the data offset and the dynamic adjustment scale, adjust the gain according to the dynamic adjustment scale, and process the black pixel data and the normal pixel data of the second frame according to the calculated calibration value and the adjusted gain.

The present disclosure further provides a data processing circuit for processing black pixel data and normal pixel data received from a sensor array. The data processing circuit includes an analog front end and a digital back end. The analog front end is configured to output digital black pixel data and digital normal pixel data converted from the black pixel data and the normal pixel data processed by a gain and an initial calibration value. The digital back end is coupled downstream of the analog front end, and configured to determine the gain and the initial calibration value, calculate a data offset according to the digital black pixel data, determine a dynamic adjustment scale for amplifying the digital normal pixel data, calculate a calibration value according to the gain, the data offset and the dynamic adjustment scale, and adjust the gain according to the dynamic adjustment scale.

BRIEF DESCRIPTION OF THE DRAWINGS

Other objects, advantages, and novel features of the present disclosure will become more apparent from the following detailed description when taken in conjunction with the accompanying drawings.

DETAILED DESCRIPTION OF THE EMBODIMENT

It should be noted that, wherever possible, the same reference numbers will be used throughout the drawings to refer to the same or like parts.

Figure 4:
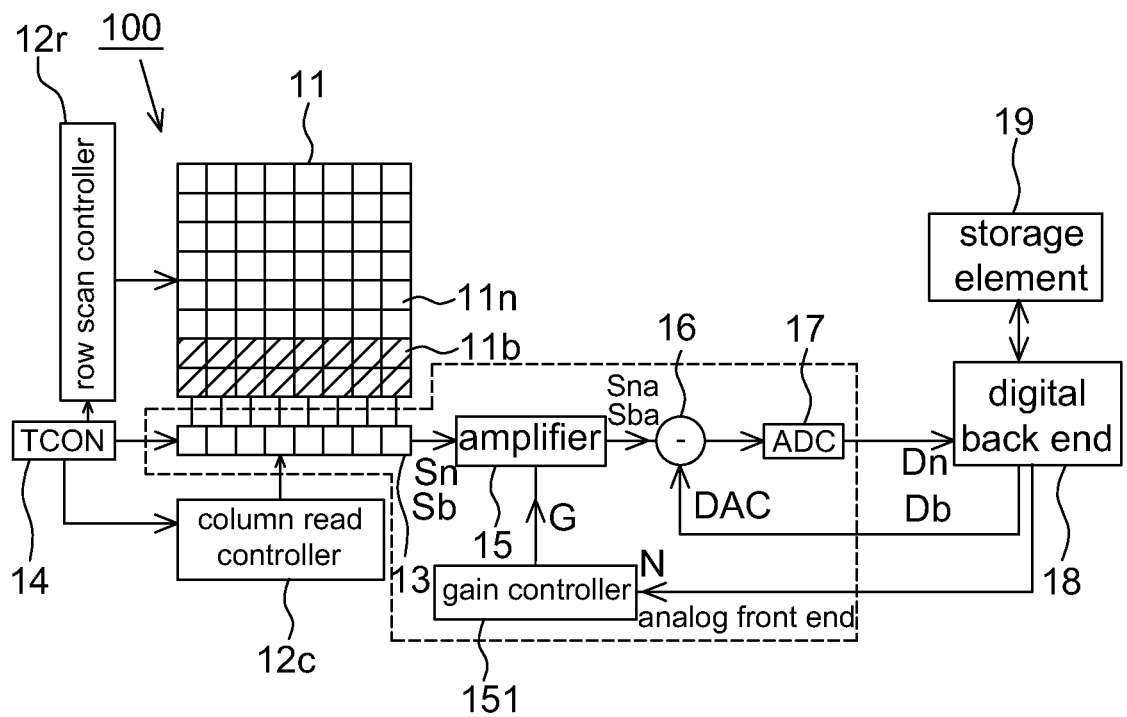
FIG. 4 is a schematic diagram of a digital image sensor according to one embodiment of the present disclosure.

Please refer to FIG. 4, it is a schematic diagram of a digital imaging device according to one embodiment of the present disclosure. The digital imaging device 100 includes a sensor array 11, an analog front end and a digital back end 18, wherein the analog front end is coupled to output terminals of the sensor array 11 (e.g. a plurality of output electrodes), and the digital back end 18 is coupled to the analog front end.

The sensor array 100 includes a plurality of black pixels 11b and a plurality of normal pixels 11n, wherein the black pixels 11b output black pixel data Sb and the normal pixels 11n output normal pixel data Sn. The analog front end amplifies and calibrates the black pixel data Sb and the normal pixel data Sn to allow a data range of the normal pixel data Sn to match a dynamic range (described later) of the digitization as much as possible. The digital back end 18 processes digital pixel data.

The sensor array 100 includes a plurality of pixels arranged in an array (e.g. 8×8 pixel array shown in FIG. 4), wherein a plurality of black pixels 11b are shown as the region filled by oblique lines and a plurality of normal pixels 11n are shown as the non-filled region. It should be mention that the arrangement of the black pixels 11b is not limited to that shown in FIG. 4. Pixel structures of the black pixels 11b and the normal pixels 11n are the same, e.g., both of the black pixels 11b and the normal pixels 11n including a photodiode and a plurality of transistors. The difference between the black pixels 11b and the normal pixels 11n is that a shielding layer (e.g. a metallic layer or non-metallic layer) is further formed over the black pixels 11b to block the black pixels 11b from receiving the light from outside, wherein the method of forming a shielding layer on the normal pixel is known and not an object of the present disclosure, and thus details thereof are not described herein. Accordingly, black pixel data Sb outputted by the black pixels 11b only relates to the dark current, wherein the dark current relates to, e.g., the surrounding temperature. Normal pixel data Sn outputted by the normal pixels 11n relates to both the dark current and photocurrent which is induced by external light irradiating the pixels, wherein the photocurrent, e.g., is positively correlated with the intensity of ambient light. The black pixel data Sb in the present disclosure is used to obtain a data offset caused by pixels themselves and the analog front end (describing later).

Pixel data of the sensor array 100 is scanned and read by a row scan controller 12r and a column read controller 12c, and the timing of scanning and reading of the pixel data is controlled by a timing controller, wherein a method of a timing controller controlling a row scan controller and a column read controller to scan and read pixel data is known and not an object of the present disclosure, and thus details thereof are not described herein.

In the present disclosure, the analog front end amplifies the black pixel data Sb and the normal pixel data Sn with a gain G, and calibrates data ranges of the amplified black pixel data Sba and the amplified normal pixel data Sna with a calibration value DAC to match a dynamic range of the digitization as much as possible, wherein the calibration value DAC and the gain G are controlled or provided by the digital back end 18.

In some embodiments, the analog front end includes a sample hold circuit 13, an amplifier 15, a gain controller 151 and a subtractor 16. It should be mentioned that although FIG. 4 shows that an analog to digital converter (ADC) 17 is included in the analog front end, the present disclosure is not limited thereto. In other embodiments, the analog to digital converter 17 is included in the digital back end 18 without particular limitations as long as the analog to digital converter 17 is able to receive amplified and calibrated pixel data and output digital black pixel data Db and digital normal pixel data Dn. In other words, the shown position of the analog to digital converter 17 is only intended to describe, and it is possible that the analog to digital converter 17 is included in an analog front end, in a digital back end or outside of the analog front end and the digital back end. Besides, the analog front end further includes other elements, e.g., a filter circuit, and since they are not directly related to the present disclosure, and thus derails thereof are not described herein.

The sample hold circuit 13 is, for example, a correlated double sampling circuit (CDS) which temporarily holds the black pixel data Sb and the normal pixel data Sn samples from the sensor array 11, and an operation of the sample hold circuit 13 is controlled by the timing controller 14. For example, the sample hold circuit 13 temporarily saves pixel data of one row of black pixels 11b or one row of normal pixels 11n every time to sequentially sample and hold the pixel data of all pixels of the sensor array 11 within a frame period.

The amplifier 15 is, for example, an integrated programmable gain amplifier (IPGA) and connects to the sample hold circuit 13 to receive the pixel data held in the sample hold circuit 13. The amplifier 15 is controlled by the gain controller 151 to amplify the black pixel data Sb and the normal pixel data Sn with a gain G (or an adjusted gain NG) to generate amplified black pixel data Sba and amplified normal pixel data Sna. In the present disclosure, the amplifier 15 includes a single stage amplification unit or cascaded multistage amplification units without particular limitations.

The subtractor 16 subtracts a calibration value DAC from the amplified black pixel data Sba and the amplified normal pixel data Sna to allow a pixel data range to match a dynamic range of the analog to digital converter 17. According to the calibration value DAC provided by the digital back end 18, the subtractor 16 is implemented by an adder. In addition, when the amplifier 15 includes a single stage amplification unit, the subtractor 16 (or an adder) is coupled to an output terminal of the single stage amplification unit. When the amplifier 15 includes multistage amplification units, the subtractor 16 (or an adder) is coupled between the amplification units or coupled to an output terminal of a final stage amplification unit among the amplification units without particular limitations. Furthermore, when the amplifier 15 includes multistage amplification units, the analog front end includes several subtractors or adders to calculate a difference between a plurality of calibration values DAC respectively with the amplified black pixel data Sba and the amplified normal pixel data Sna.

The digital back end 18 digitizes amplified and calibrated black pixel data and digitizes amplified and calibrated normal pixel data, calculates a data offset Δ according to digital black pixel data Db, determines a dynamic adjustment scale M, calculates the calibration value DAC according to the gain G, the data offset Δ and the dynamic adjustment scale M, and adjusts the gain G according to the dynamic adjustment scale M. An embodiment of the operation of the digital back end 18 is described below. As mentioned above, when the analog to digital converter 17 is in the analog front end, the step of digitizing amplified and calibrated black pixel data and digitizing amplified and calibrated normal pixel data is processed in the analog front end.

Figure 5:
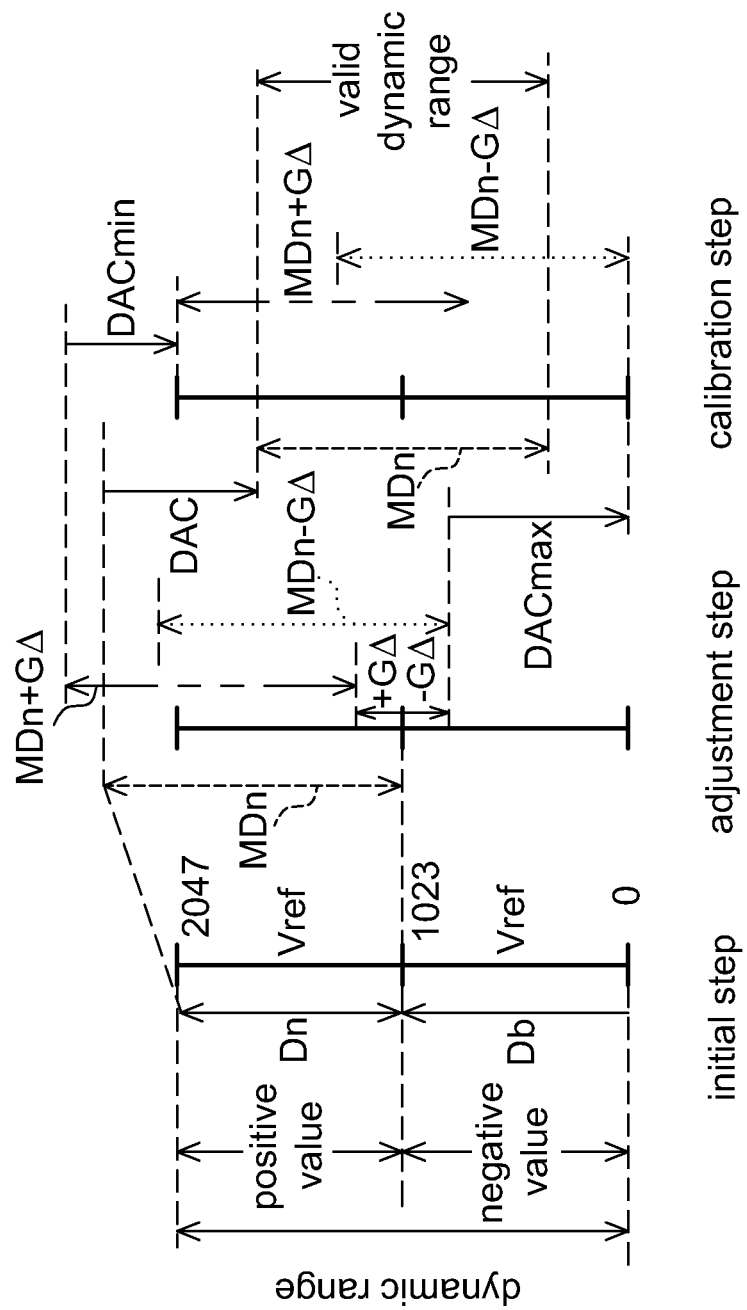
FIG. 5 is a schematic diagram of an operation of a digital image sensor according to one embodiment of the present disclosure.

Referring to FIGS. 4 and 5, FIG. 5 is a schematic diagram of the operation of a digital image sensor according to one embodiment of the present disclosure, wherein the operation of optimizing the data range is described by an initial step, an adjustment step and a calibration step. In addition, FIG. 5 is described by an 11 bits dynamic range, but not limited thereto. A number of sampling bits of the analog to digital converter 17 is determined according to the device actually being used.

In the initial step, a data range of digital normal pixel data Dn (e.g. Vref=1 mV) which is converted by the analog to digital converter 17 is substantially positive values, and a data range of digital black pixel data Db (e.g. Vref=1 mV) is substantially around, but not limited to, a digital value of 1023, wherein digital values outputted by the analog to digital converter 17 are all positive values (shown as digital values of 0 to 2047 in figure). Digital values of 1024 to 2047 are defined as positive values and digital values of 0 to 1023 are defined as negative values herein.

Referring to FIG. 5, in the initial step, a data range of the digital normal pixel data Dn is substantially a half of a sample dynamic range of the analog to digital converter 17. The present disclosure is to allow the data range of the amplified and calibrated normal pixel data to match the digitization range (e.g. digital values of 0 to 2047) of the analog to digital converter 17 as much as possible.

For example, in a first frame, the digital back end 18 controls, through the gain controller 151, the amplifier 15 to amplify the normal pixel data Sn and the black pixel data Sb with a gain G To increase a valid dynamic range, the digital back end 18 calculates a dynamic adjustment scale M and a calibration value DAC with the adjustment step and the calibration step to calibrate the amplified normal pixel data Sna according to the calibration value DAC in a second frame (e.g. a frame after the first frame), wherein a gain in the second frame is also adjusted according to the dynamic adjustment scale M to increase the valid dynamic range. Because the gain controller 151 is controlled by the digital back end 18, the digital back end 18 has already known a value of the gain G.

Figure 1:
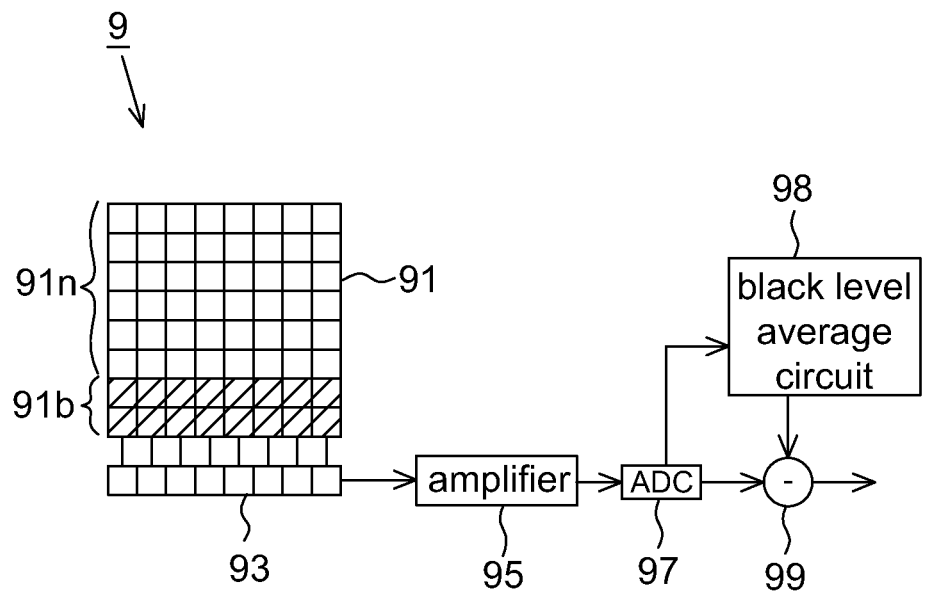
FIG. 1 is a schematic diagram of a conventional image sensor.
Figure 2:
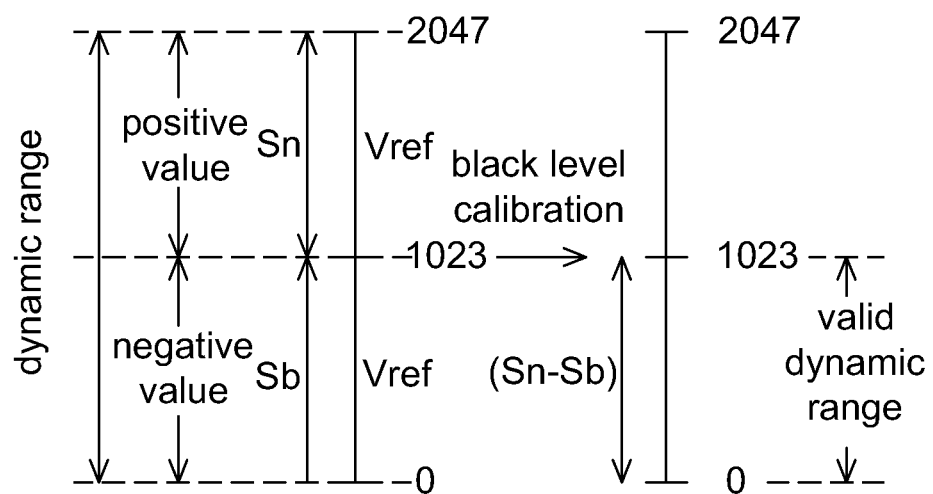
FIG. 2 is a schematic diagram of a black level calibration of the image sensor in FIG. 1.
Figure 3:
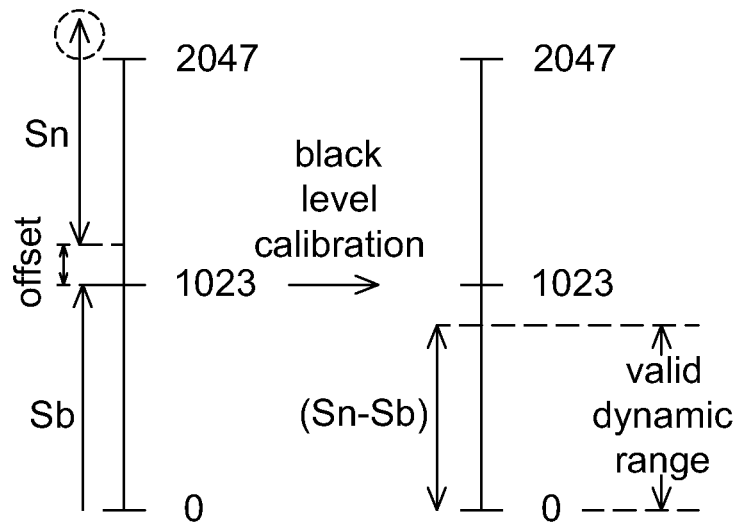
FIG. 3 is another schematic diagram of a black level calibration of the image sensor in FIG. 1.

The digital back end 18 calculates a difference value between an average value of the digital black pixel data Db and a reference value (e.g. a digital value of 1023, but not limited to) and divides the difference value by the gain G to be used as the data offset Δ, wherein the data offset Δ is caused by, e.g., pixels and the sample hold circuit 13, and the data offset Δ is the reason causing the shrinkage of the valid dynamic range, as shown in FIG. 3. The reference value is selected as an ideal value which is outputted by the black pixels 11b, i.e. a value not having the data offset Δ. The data offset Δ is amplified to GΔ by the amplifier 15, e.g., +G Δ and −G Δ shown in the adjustment step.

The digital back end 18 amplifies digital normal pixel data Dn with the dynamic adjustment scale M to generate MDn. If the data offset Δ does not exist, when the dynamic adjustment scale M is selected as 2, the dynamic range of the analog to digital converter 17 is completely usable. However, as there is the data offset Δ, the dynamic adjustment scale M is selected, e.g., between 1.5-1.9 depending on the data offset Δ obtained by the digital back end 18. For example, affected by the data offset Δ, the digital normal pixel data MDn after being adjusted shifts upwardly or downwardly by GΔ, e.g., MDn+GΔ and MDn-GΔ shown in the adjustment step.

In one embodiment, the digital back end 18 determines the dynamic adjustment scale M according to a look-up table. For example, inside or outside the digital back end 18 there is a storage element 19, e.g., a dynamic random access memory (RAM) or read only memory (ROM) for storing a look-up table (LUT). The look-up table pre-stores the relationship between a plurality of data offsets Δ and a plurality of gains G with respect to a plurality of the dynamic adjustment scales M. Accordingly, the digital back end 18 determines the dynamic adjustment scale M by comparing a current gain and a current data offset (e.g. obtained according to the first frame) with the look-up table.

In another embodiment, to optimize the dynamic adjustment scale M, the digital back end 18 is further able to determine the dynamic adjustment scale M according to an interaction algorithm. For example, the digital back end 18 calculates a maximum calibration value DACmax and a minimum calibration value DACmin according to the gain G, the data offset Δ and the dynamic adjustment scale M. When the maximum calibration value DACmax is larger than the minimum calibration value DACmin, the dynamic adjustment scale M is increased, a new maximum calibration value and a new minimum calibration value are recalculated, and the new maximum calibration value and the new minimum calibration value are compared. The dynamic adjustment scale M is continuously increased in this manner until the new maximum calibration value is smaller than or equal to the new minimum calibration value. An associated maximum dynamic adjustment M when the new maximum calibration value is still larger than the new minimum calibration value is selected as an optimum dynamic adjustment scale.

In one embodiment, the digitalization of the analog to digital converter 17 is assumed to have a dynamic range (e.g. digital values of 11 bits shown in FIG. 5, 0 to 2047). The maximum calibration value DACmax is obtained by subtracting a product of the gain G and the data offset Δ from a half of the dynamic range, i.e. DACmax=1024−(G×Δ), wherein the maximum calibration value DACmax is to prevent the shifted normal pixel data MDn−GΔ from exceeding a minimum value of the dynamic range (as shown in the calibration step). The minimum calibration value DACmin is obtained by subtracting a half of the dynamic range from a summation of a product of the half of the dynamic range and the dynamic adjustment scale M and a product of the gain G and the data offset Δ, i.e. DACmin=(1024×M)+(G×Δ)−1024, wherein the minimum calibration value DACmin is to prevent the offset normal pixel data MDn+GΔ from exceeding a maximum value of the dynamic range (as shown in the calibration step).

After the digital back end 18 calculates a maximum calibration value DACmax and a minimum calibration value DACmin according to the gain G, the data offset Δ, and the dynamic adjustment scale M (as shown in the calibration step), the digital back end 18 further calculates an average value of the maximum calibration value DACmax and the minimum calibration value DACmin to be used as the calibration value DAC. By using the average value as the calibration value DAC, the amplified and calibrated normal pixel data does not exceed the dynamic range of the analog to digital converter 17.

Then, after the digital back end 18 converts the calibration value DAC to an analog direct current value (e.g. by a digital to analog converter), the analog direct current value is provided to a subtractor 16 of the analog front end. Meanwhile, the digital back end 18 multiplies an unadjusted gain G by a multiple N to adjust the gain to NG, and the multiple N is a quotient of the dynamic adjustment scale M divided by the gain G. Accordingly, because the multiple N and the dynamic adjustment scale M is obtained by current data offset Δ and current gain G, MDn is larger than Dn and within the dynamic range so as to increase the valid dynamic range and the image quality.

It should be mention that the three steps of FIG. 5 are all obtained in the digital back end 18, e.g., calculated by a digital signal processor (DSP) therein according to the digital black pixel data Db and the digital normal pixel data Dn using an algorithm implemented by software, hardware and/or firmware.

Figure 6:
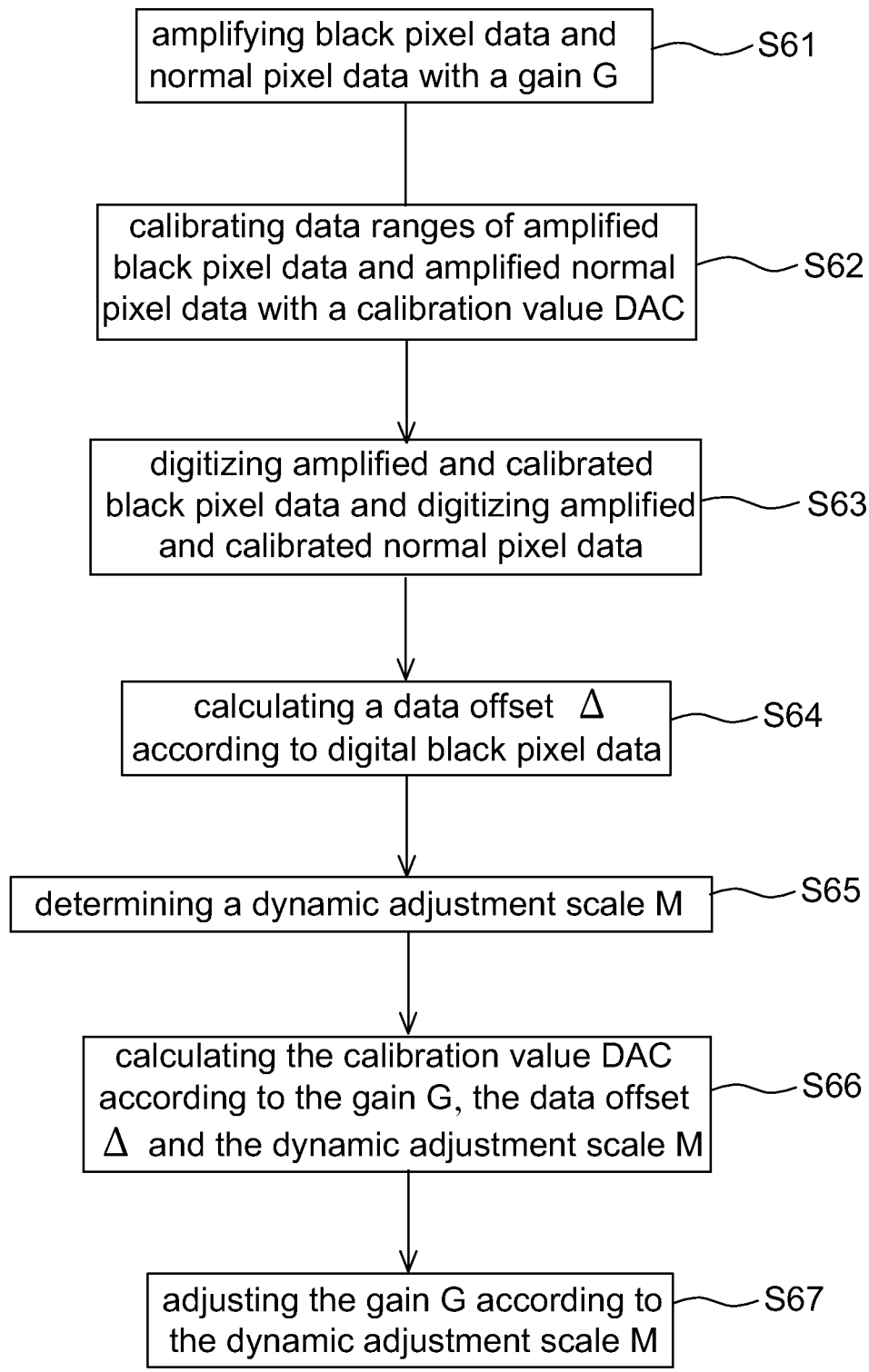
FIG. 6 is a flow chart of an operating method of a digital imaging device according to one embodiment of the present disclosure.

Referring to FIG. 6, it is a flow chart of an operating method of a digital imaging device according to one embodiment of the present disclosure, including following steps: amplifying black pixel data and normal pixel data with a gain (step S61); calibrating data ranges of the amplified black pixel data and the amplified normal pixel data with a calibration value (step S62); digitizing the amplified and calibrated black pixel data and digitizing the amplified and calibrated normal pixel data (step S63); calculating a data offset according to digital black pixel data (step S64); determining a dynamic adjustment scale (step S65); calculating the calibration value according to the gain, the data offset and the dynamic adjustment scale (step S66); and adjusting the gain according to the dynamic adjustment scale (step S67).

Please also refer to FIGS. 4 and 5, details of the operating method are described hereinafter.

Step S61: For example, in a first frame (e.g. an image frame captured when the digital imaging device 100 starts operating or leaves a sleep mode), the sensor array 11 outputs a plurality of black pixel data Sb and a plurality of normal pixel data Sn. The digital back end 18 controls the amplifier 15 by the gain controller 151 to amplify the black pixel data Sb and the normal pixel data Sn with a gain G to generate amplified black pixel data Sba and amplified normal pixel data Sna.

Step S62: The digital back end 18 outputs a calibration value DAC to the subtractor 16 to calibrate data ranges of the amplified black pixel data Sba and the amplified normal pixel data Sna, wherein the calibration value DAC is, for example an analog direct current value. In addition, corresponding to the first frame, an initial value of the calibration value DAC is, for example 0, but not limited thereto. Corresponding to the data frame after the first frame, the calibration value DAC is determined according to the calculation result of the digital back end 18.

Step S63: The analog to digital converter 17 digitizes the amplified and calibrated black pixel data and the amplified and calibrated normal pixel data to respectively generate digital black pixel data Db and digital normal pixel data Dn, wherein the amplification is performed by the amplifier 15, whereas the calibration is performed by the subtractor 16.

Step S64: The digital back end 18 calculates a data offset Δ according to the digital black pixel data Db. As mentioned above, the digital back end 18, for example, calculates a difference value between an average value of the digital black pixel data Db and a reference value (e.g., shown as 1023 in FIG. 5, but not limited to) to be used as the data offset ΔG, which represents data offset caused by other reasons instead of photocurrent.

Step S65: The digital back end 18 also determines a dynamic adjustment scale M, as shown in FIG. 5. In one embodiment, the digital back end 18 compares a current gain G and a current data offset Δ (e.g. obtained according to the first frame) with a look-up table to determine the dynamic adjustment scale M, wherein the look-up table pre-stores a relationship of a plurality of data offsets and a plurality of gains with respect to a plurality of dynamic adjustment scales, and the look-up table is stored in the storage element 19. In another embodiment, the digital back end 18 determines the dynamic adjustment scale M according to an iteration algorithm. For example, the digital back end 18 calculates a maximum calibration value DACmax and a minimum calibration value DACmin according to a current gain, a current data offset and a current dynamic adjustment scale (as shown in FIG. 5). When the maximum calibration value DACmax is larger than the minimum calibration value DACmin, the dynamic adjustment scale M is increased, a new maximum calibration value and a new minimum calibration value are recalculated, and the dynamic adjustment scale M is continuously increased until the new maximum calibration value is smaller than or equal to the new minimum calibration value, wherein the current dynamic adjustment scale is determined, for example, according to the current gain and the current data offset (e.g. determined according to the look-up table). When the new maximum calibration value is smaller than or equal to the new minimum calibration value, a maximum dynamic adjustment scale that allows the new maximum calibration value still to be larger than the new minimum calibration value is selected as an optimum dynamic adjustment scale.

Step S66: The digital back end 18 calculates the calibration value DAC according to the gain G, the data offset Δ and the dynamic adjustment scale M. As mentioned above, the digital back end 18 calculates a maximum calibration value DACmax and a minimum calibration value DACmin (as shown in FIG. 5) according to the gain G, the data offset Δ and the dynamic adjustment scale M (or the optimum dynamic adjustment scale), and calculates an average value of the maximum calibration value DACmax and the minimum calibration value DACmin as the calibration value DAC to prevent the amplified and calibrated normal pixel data from exceeding the dynamic range of the analog to digital converter 17.

Step S67: Finally, the digital back end 18 transmits the calibration value DAC to the subtractor 16 and adjusts the gain G according to the dynamic adjustment scale M. For example, the digital back end 18 controls the gain controller 151 to multiply the gain G by a multiple N to generate a new gain NG, wherein the multiple N is a quotient of the dynamic adjustment scale M divided by the gain G.

Next, the sensor array 11 outputs a second frame, and the analog front end processes the black pixel data Sb and the normal pixel data Sn with the calibration value DAC and the new gain NG to effectively utilize the dynamic range of the analog to digital converter 17.

The digital imaging device 100 is able to perform the operating method of FIG. 6 every predetermined time and/or each time of the starting procedure or leaving the sleep mode without performing corresponding to every image frame.

It should be mention that, a sequence of the steps S64-S66 performed by the digital back end 18 is not limited to that shown in FIG. 6 depending on the circuit design or the algorithm in the digital back end 18. The steps are able to be calculated simultaneously or sequentially without particular limitations.

As mentioned above, the conventional imaging device is affected by the signal offset to have a smaller valid dynamic range. Therefore, the present disclosure provides a digital imaging device (FIG. 4) and an operating method thereof that optimize the data range in the analog stage to match a dynamic range of an analog to digital converter as much as possible to further improve the signal resolution and the image quality.

Although the disclosure has been explained in relation to its preferred embodiment, it is not used to limit the disclosure. It is to be understood that many other possible modifications and variations can be made by those skilled in the art without departing from the spirit and scope of the disclosure as hereinafter claimed.

What is claimed is:

1. An operating method of a digital imaging device, the digital imaging device comprising a sensor array, an analog-to-digital converter and a digital back end, the sensor array comprising a plurality of black pixels for outputting black pixel data and a plurality of normal pixels for outputting normal pixel data, and the sensor array sequentially outputting a first frame and a second frame, the operating method comprising:
   determining, by the digital back end, a gain and an initial calibration value for processing the black pixel data and the normal pixel data of the first frame to cause the analog-to-digital converter to output digital black pixel data and digital normal pixel data;
   calculating, by the digital back end, a data offset according to the digital black pixel data;
   determining, by the digital back end, a dynamic adjustment scale for amplifying the digital normal pixel data;
   calculating, by the digital back end, a calibration value according to the gain, the data offset and the dynamic adjustment scale;
   adjusting the gain, by the digital back end, according to the dynamic adjustment scale; and
   processing, by the digital back end, the black pixel data and the normal pixel data of the second frame according to the calculated calibration value and the adjusted gain.

2. The operating method as claimed in claim 1, wherein the initial calibration value is 0.

3. The operating method as claimed in claim 1, wherein the dynamic adjustment scale is determined according to a look-up table.

4. The operating method as claimed in claim 1, wherein the dynamic adjustment scale is determined according to an iteration algorithm.

5. The operating method as claimed in claim 1, wherein the second frame is a next frame of the first frame.

6. The operating method as claimed in claim 1, wherein the calculating the calibration value comprises:
   calculating a maximum calibration value and a minimum calibration value according to the gain, the data offset and the dynamic adjustment scale; and
   calculating an average value of the maximum calibration value and the minimum calibration value as the calibration value.

7. The operating method as claimed in claim 1, wherein the adjusting comprises:
   multiplying the gain by a multiple, which is a quotient of the dynamic adjustment scale divided by the gain.

8. The operating method as claimed in claim 1, wherein the calculating the data offset comprises:
   calculating a difference value between an average value of the digital black pixel data and a reference value as the data offset.

9. The operating method as claimed in claim 1, further comprising:
   amplifying the black pixel data and the normal pixel data of the first frame with the gain; and
   subtracting the initial calibration value from the amplified black pixel data and the amplified normal pixel data to generate amplified and calibrated black pixel data and amplified and calibrated normal pixel data, respectively;
   converting, by the analog-to-digital converter, the amplified and calibrated black pixel data to the digital black pixel data; and
   converting, by the analog-to-digital converter, the amplified and calibrated normal pixel data to the digital normal pixel data.

10. The operating method as claimed in claim 1, wherein the dynamic adjustment scale is between 1.5-1.9.

11. A digital imaging device, comprising:
   a sensor array comprising a plurality of black pixels and a plurality of normal pixels, wherein the black pixels are configured to output black pixel data, the normal pixels are configured to output normal pixel data and the sensor array is configured to sequentially output a first frame and a second frame;
   an analog front end configured to output digital black pixel data and digital normal pixel data converted from the black pixel data and the normal pixel data of the first frame processed by a gain and an initial calibration value; and
   a digital back end configured to
      determine the gain and the initial calibration value,
      calculate a data offset according to the digital black pixel data,
      determine a dynamic adjustment scale for amplifying the digital normal pixel data,
      calculate a calibration value according to the gain, the data offset and the dynamic adjustment scale,
      adjust the gain according to the dynamic adjustment scale, and process the black pixel data and the normal pixel data of the second frame according to the calculated calibration value and the adjusted gain.

12. The digital imaging device as claimed in claim 11, wherein the initial calibration value is 0.

13. The digital imaging device as claimed in claim 11, wherein the dynamic adjustment scale is determined according to a look-up table.

14. The digital imaging device as claimed in claim 11, wherein the dynamic adjustment scale is determined according to an iteration algorithm.

15. The digital imaging device as claimed in claim 11, wherein the second frame is a next frame of the first frame.

16. The digital imaging device as claimed in claim 11, wherein the dynamic adjustment scale is between 1.5-1.9.

17. A data processing circuit for processing black pixel data and normal pixel data received from a sensor array, the data processing circuit comprising:
   an analog front end configured to output digital black pixel data and digital normal pixel data converted from the black pixel data and the normal pixel data processed by a gain and an initial calibration value; and
   a digital back end coupled downstream of the analog front end, and configured to
      determine the gain and the initial calibration value,
      calculate a data offset according to the digital black pixel data,
      determine a dynamic adjustment scale for amplifying the digital normal pixel data,
      calculate a calibration value according to the gain, the data offset and the dynamic adjustment scale, and
      adjust the gain according to the dynamic adjustment scale.

18. The data processing circuit as claimed in claim 17, wherein the initial calibration value is 0.

19. The data processing circuit as claimed in claim 17, wherein the dynamic adjustment scale is determined according to a look-up table.

20. The data processing circuit as claimed in claim 17, wherein the dynamic adjustment scale is determined according to an iteration algorithm.

* * * * *